US012734551B2

(12) United States Patent
Agrawal et al.

(10) Patent No.: US 12,734,551 B2
(45) Date of Patent: Sep. 15, 2026

(54) SCRAP MATERIAL IDENTIFICATION WITH FILTRATION AND REUSE DURING SUSTAINABLE ADDITIVE MANUFACTURING

(71) Applicant: INTERNATIONAL BUSINESS MACHINES CORPORATION, Armonk, NY (US)

(72) Inventors: Tushar Agrawal, West Fargo, ND (US); Jeremy R. Fox, Georgetown, TX (US); Fang Lu, Billerica, MA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 18/526,026

(22) Filed: Dec. 1, 2023

(65) Prior Publication Data

US 2025/0178034 A1 Jun. 5, 2025

(51) Int. Cl.
*B07C 5/34* (2006.01)
*B22F 10/34* (2021.01)
(Continued)

(52) U.S. Cl.
CPC ................ *B07C 5/34* (2013.01); *B22F 10/34* (2021.01); *B22F 10/70* (2021.01); *B29C 64/314* (2017.08);
(Continued)

(58) Field of Classification Search
CPC ... B07C 5/34; B07C 2501/0054; B22F 10/34; B22F 10/70; B22F 8/00; B22F 10/73;
(Continued)

(56) References Cited

U.S. PATENT DOCUMENTS 7,987,632 B2 * 8/2011 May ......................... A01G 7/00
47/DIG. 6
9,636,871 B2 5/2017 Butler
(Continued)

FOREIGN PATENT DOCUMENTS

WO 2019215180 A1 11/2019
WO 2021245497 A1 12/2021

OTHER PUBLICATIONS

Anonymous, "Identify and Correct 3D Printing Problems," Cults [blog], [accessed on Jul. 28, 2023], 23 pages, Retrieved from the Internet: <URL: https://cults3d.com/en/blog/articles/identify-correct-3D-printing-problems-defaults>.
(Continued)

*Primary Examiner* — Garcia Ade
(74) *Attorney, Agent, or Firm* — Teddi E. Maranzano

(57) ABSTRACT

Systems and methods are provided for recovering LED light in indoor multi-level farms. A plurality of cameras and sensors capture in real time in a vertical farm environment a plurality of camera images and sensor data. The camera images include physical images of the vertical farm environment, and the sensor data includes light data. The camera images and sensor data are analyzed to identify a pattern of light origin and direction in the vertical farm environment. The plant characteristics are identified based on comparing the captured camera images, using image recognition, against a model. Based on the identified plant characteristics, manipulating the light data. The plant characteristics include plant species growth state and general health. The light is manipulated by breaking it into component visible light wavelengths. The model predicts optimizing the redirecting of the optimal wavelengths for improved plant growth.

20 Claims, 4 Drawing Sheets

(51) Int. Cl.

| | |
|---|---|
| ***B22F 10/70*** | (2021.01) |
| ***B29C 64/314*** | (2017.01) |
| ***B29C 64/357*** | (2017.01) |
| ***B29C 64/386*** | (2017.01) |
| ***B33Y 40/10*** | (2020.01) |
| ***B33Y 50/00*** | (2015.01) |
| *B28B 1/00* | (2006.01) |
| *B29K 105/26* | (2006.01) |

(52) U.S. Cl.
CPC .......... *B29C 64/357* (2017.08); *B29C 64/386* (2017.08); *B33Y 40/10* (2020.01); *B33Y 50/00* (2014.12); *B07C 2501/0054* (2013.01); *B28B 1/001* (2013.01); *B29K 2105/26* (2013.01)

(58) Field of Classification Search
CPC ..... B22F 12/82; B29C 64/314; B29C 64/357; B29C 64/386; B33Y 40/10; B33Y 50/00; B28B 1/001; B29K 2105/26; C22B 7/005; G06N 20/00
See application file for complete search history.

(56) References Cited

U.S. PATENT DOCUMENTS

| | | | | |
|---|---|---|---|---|
| 11,341,289 | B2 | 5/2022 | Coskun | |
| 2010/0115830 | A1* | 5/2010 | Dube | G01N 21/6486 356/402 |
| 2019/0377946 | A1* | 12/2019 | Genty | G06N 3/045 |
| 2020/0160497 | A1 | 5/2020 | Shah | |
| 2020/0184153 | A1* | 6/2020 | Bongartz | A01G 9/249 |
| 2022/0184857 | A1 | 6/2022 | Guinaldo Fernández | |
| 2023/0088387 | A1 | 3/2023 | Kumar | |

OTHER PUBLICATIONS

Dwamena, "How to Fix Broken 3D Printed Parts—PLA, ABS, PETG, TPU," #D Printerly [guide], 2023 [accessed on Jul. 28, 2023], 16 pages, Retrieved from the Internet: <URL: https://3dprinterly.com/how-to-fix-broken-3d-printed-parts/>.

Fischer, "Recycling of 3D-Printed Parts and Articles: A Sustainability Study," IP.com, May 17, 2021, 6 pages, IP.com No. IPCOM000265829D, Retrieved from the Internet: <URL: https://priorart.ip.com/IPCOM/000265829>.

IBM "IBM Watson Health is now Merative," IBM [online], [accessed on Jul. 28, 2023], 2 pages, Retrieved from the Internet: <URL: https://www.ibm.com/watson-health/merative-divestiture>.

IBM Institute for Business Value, "Shifting transport paradigms: Understanding the implications of 3D printing on the global transportation industry," IBM [online], Sep. 24, 2014 [accessed on Aug. 29, 2023], 6 pages, Retrieved from the Internet: <URL: https://w3.ibm.com/services/lighthouse/documents/39220>.

IBM Institute for Business Value, "The CEO's Guide to Generative AI" IBM [online], [accessed on Jul. 28, 2023, 7 pages, Retrieved from the Internet: <URL: https://www.ibm.com/thought-leadership/institute-business-value>.

Peterson, et al., "Shifting transport paradigms: Understanding the implications of 3D printing on the global transportation industry," IBM Institute for Business Value [executive report], Sep. 2014, 16 pages, Retrieved from the Internet: <URL: https://w3.ibm.com/services/lighthouse/documents/39220>.

Ventre, "How 3D Printing Could Help to Regrow Teeth from the Root," azom.com [article], Jun. 9, 2021 [accessed on Jul. 28, 2023], 5 pages, Retrieved from the Internet: <URL: https://www.azom.com/article.aspx?ArticleID=20487>.

Willis, "Latest Release of IBM iConnect Access® Provides Foundation for Planned Future 3D Printing Solution," IBM [announcement], May 24, 2021 [accessed on Jul. 28, 2023], 2 pages, Retrieved from the Internet: <URL: https://newsroom.ibm.com/2021-05-24-Latest-Release-of-IBM-iConnect-Access-R-Provides-Foundation-for-Planned-Future-3D-Printing-Solution>.

* cited by examiner

SCRAP MATERIAL IDENTIFICATION WITH FILTRATION AND REUSE DURING SUSTAINABLE ADDITIVE MANUFACTURING

BACKGROUND

This invention relates generally to computer systems, and more particularly to 3D printing technology.

3D printing technology has the potential to enhance repair and maintenance processes by enabling the on-site production of replacement parts. It also accommodates a broad range of materials, including metals, plastics, ceramics, and even biological materials, contributing to its adaptability across industries. This technology can further be integrated with robotic systems that exhibit self-mobility and cooperative behavior, enabling collaborative 3D printing through swarming robots.

Despite its myriad benefits, 3D printing technology also presents unique challenges. One of the main issues pertains to the management of scrap material generated during the 3D printing process. Such materials, varying widely in type, shape, and dimension, hold significant potential for reuse in subsequent printing jobs. However, the lack of an effective filtering and classification system often leads to unnecessary wastage. Consequently, while 3D printing continues to redefine industries with its innovative applications, the efficient and effective management of scrap materials remains a problem in need of a robust solution. Therefore, a sustainable approach is needed.

SUMMARY

Systems and methods are provided for recovering LED light in indoor multi-level farms. A plurality of cameras and sensors capture in real time in a vertical farm environment a plurality of camera images and sensor data. The camera images include physical images of the vertical farm environment, and the sensor data includes light data. The camera images and sensor data are analyzed to identify a pattern of light origin and direction in the vertical farm environment. The plant characteristics are identified based on comparing the captured camera images, using image recognition, against a model. Based on the identified plant characteristics, manipulating the light data. The plant characteristics include plant species growth state and general health. The light is manipulated by breaking it into component visible light wavelengths. The model predicts optimizing the redirecting of the optimal wavelengths for improved plant growth.

Embodiments are further directed to computer systems and computer program products having substantially the same features as the above-described computer-implemented method.

Figure 1:
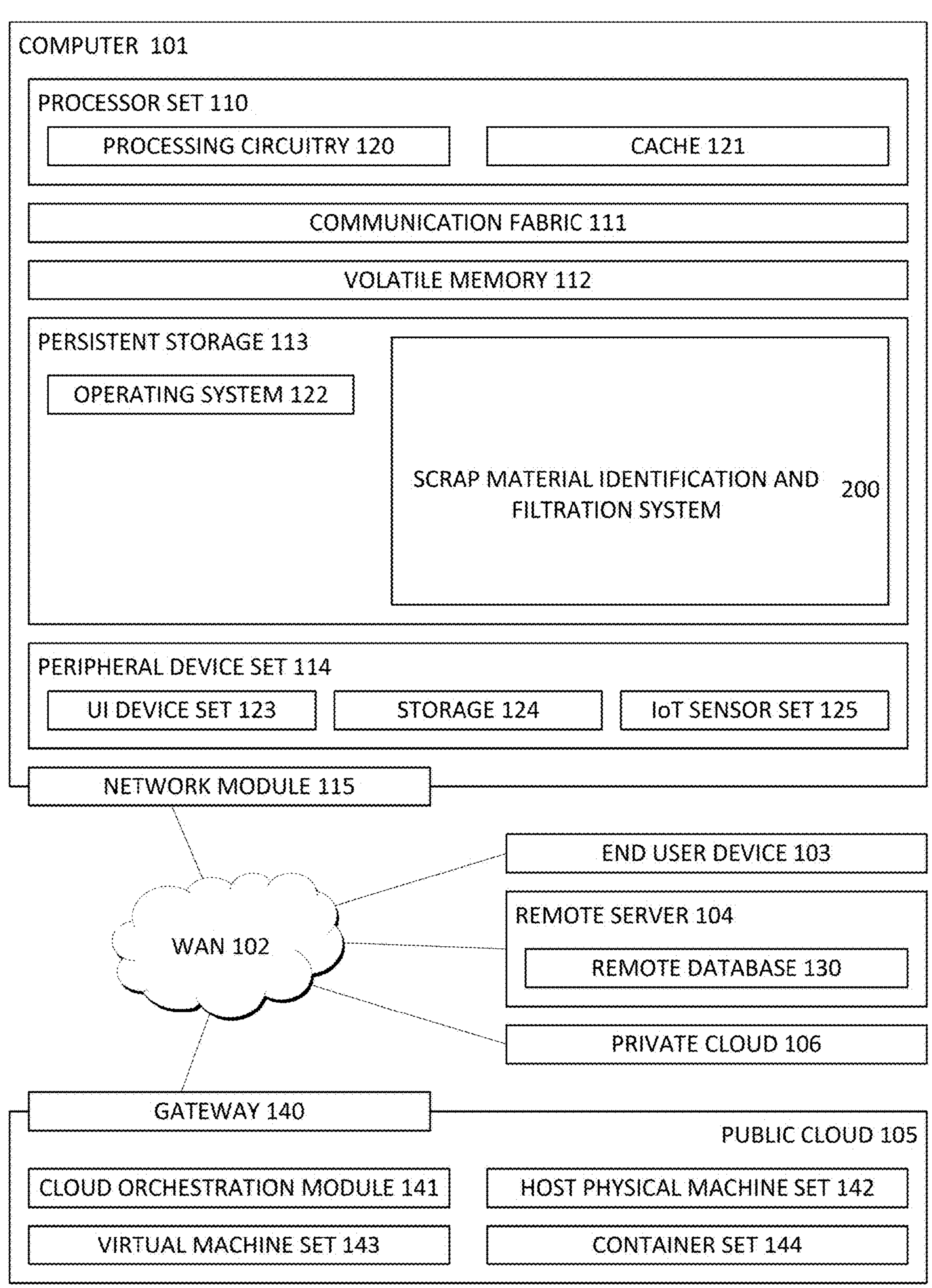
FIG. 1 illustrates the operating environment of a computer server embodying a system for scrap material identification and filtration.

DETAILED DESCRIPTION OF THE INVENTION 3D printing, also referred to as additive manufacturing, involves creating three-dimensional structures from a digital file by laying down successive layers of material. Additive manufacturing is inherently different from traditional subtractive manufacturing, which is performed by cutting or hollowing out a piece of metal or plastic using techniques such as milling. The key advantage of 3D printing is its ability to fabricate complex geometrical shapes with less material wastage compared to conventional manufacturing techniques.

3D printing technology has diverse application, including manufacturing bespoke industrial parts and prototypes, and creating personalized medical implants. Moreover, 3D printing technology has the potential to enhance repair and maintenance processes by enabling the on-site production of replacement parts. 3D printing technology also accommodates a broad range of materials, including metals, plastics, ceramics, and even biological materials, contributing to its adaptability across industries. This technology can further be integrated with robotic systems that exhibit self-mobility and cooperative behavior, enabling collaborative 3D printing through swarming robots.

Despite its benefits, 3D printing technology presents the challenge of how to manage scrap material that is generated during the 3D printing process. Such materials, varying widely in type, shape, and dimension, hold significant potential for reuse in subsequent printing jobs. However, the lack of an effective filtering and classification system can lead to escalating production costs and the wastage can negatively impact the environment. This wastage issue is further exacerbated in industries like aerospace and automotive, where high-performance, expensive materials are often used.

Some current attempts to address the challenge of reclaiming these scrap materials incorporate advanced machine learning algorithms into various models that are intended to identify and classify scrap materials. However, integrating these technologies into a unified system to effectively filter and classify scrap materials generated during 3D printing is a complex task that requires careful consideration of various technical and practical aspects. Embodiments of the present invention effectively integrate several technologies, such as robotics, machine learning, and computer vision to provide an innovative solution that effectively and efficiently handles scrap material generated during 3D printing across diverse industries.

Disclosed is a system that filters and classifies scrap materials for use in 3D printing. This innovative method enhances the efficiency of additive manufacturing processes by reusing scrap materials in a systematic and precise way. Not only does it provide a solution for reducing waste products generated during 3D printing, but it also enhances the potential for more cost-effective and sustainable 3D printing operations by reducing the reliance on fresh raw materials, thereby assisting a manufacturer in reaching ESG KPI goals.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as embodying a system for scrap metal identification and filtration 200 (system). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing. Similarly, the processor set 110 can include specialized coprocessors, such as graphical processing units to accept offloaded instructions for high-performance computing applications, such as high volumes of mathematical calculations.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
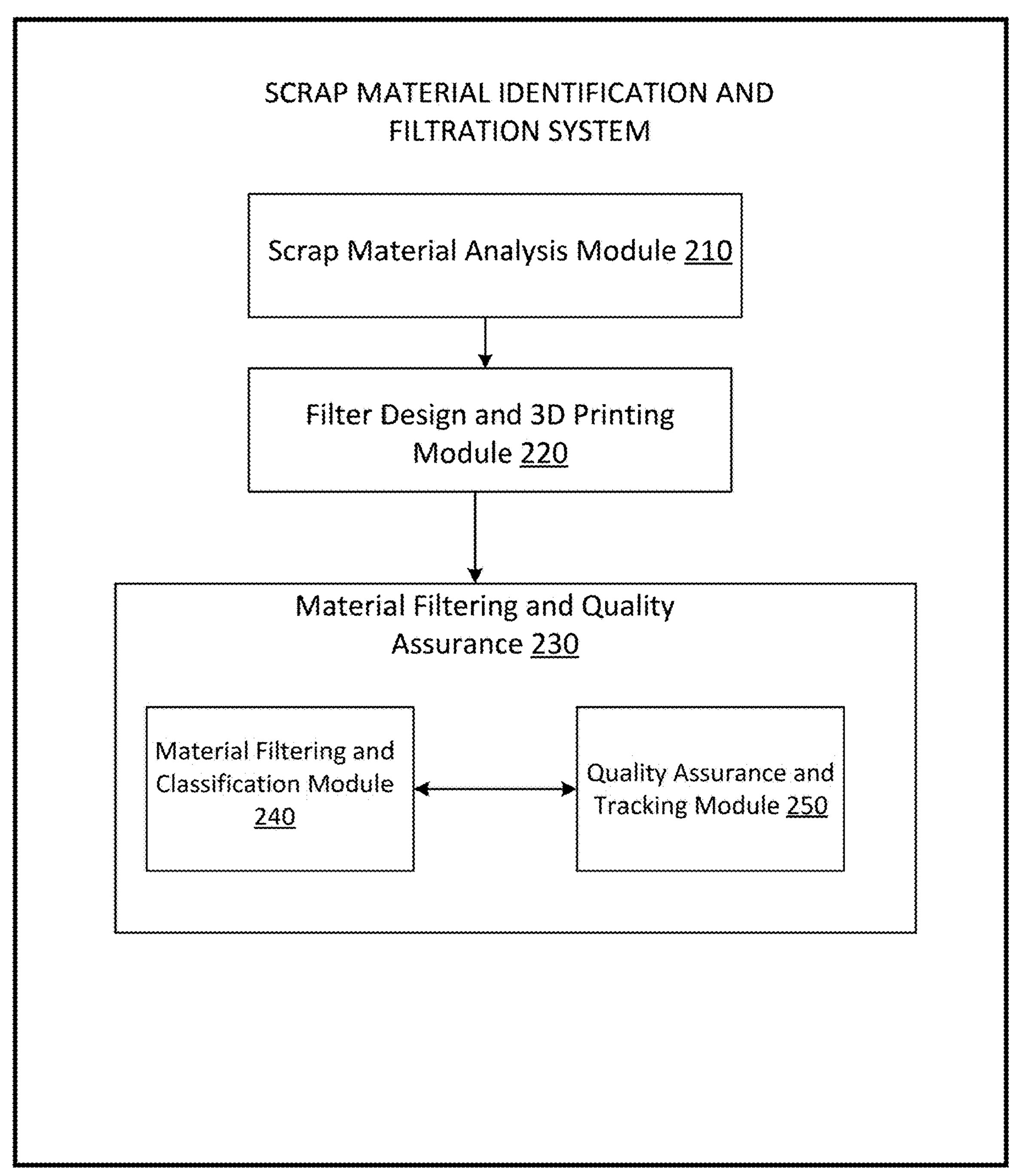
FIG. 2 illustrates an example of a scrap material identification and filtration system where embodiments of the present invention can be practiced.

FIG. 2 illustrates an example of a scrap material identification and filtration system 200 (system) where embodiments of the present invention can be practiced.

The system 200 comprises a scrap material analysis module 210, a filter design and 3D printing module 220, and a material filtering and quality assurance module 230 which further comprises a material filtering and classification module 240 and a quality assurance and tracking module 250.

The scrap material analysis module 210 categorizes and analyzes the different types of scrap materials generated during 3D printing. Machine learning algorithms and computer vision techniques determine properties of the materials, including type, shape, and dimensions.

Computer vision in combination with machine learning algorithms, particularly convolutional neural networks (CNN), train the various robotically controlled sensors to duplicate the abilities of human vision using data, algorithms, and sensors rather than retinas, optic nerves, and a visual cortex. CNN comprises node layers containing an input layer, one or more hidden layers, and an output layer. Each node connects to another and has an associated weight and threshold. If the output of any individual node is above a specified threshold value, that node is activated, sending data to the next layer of the network. Otherwise, no data is passed along to the next layer of the network. CNNs are well-suited for image recognition applications because the layers reduce the high dimensionality of images without losing the information needed to correctly classify them.

Prior to CNNs, manual, time-consuming feature extraction methods were used to identify objects in images. However, CNNs provide a more scalable approach to image classification and object recognition, leveraging principles from linear algebra, such as matrix multiplication, to identify patterns within an image. The requirement for high accuracy at a high rate of speed is computationally demanding and beyond the capabilities of the human mind. In that regard, graphical processing units (GPU) are often preferred over CPU cores. The CPU cores process instructions for the operating system that are co-mingled with those from a wide variety of different applications, including those from the system 200. In contrast, the GPU is a specialized coprocessor to which the CPU offloads certain intensive tasks. Because a GPU breaks its delegated tasks into smaller components that can be finished in parallel, repetitive tasks can be completed more quickly and accurately than processing only on a CPU.

The filter design and 3D printing module 220 takes as input the data generated by the scrap material analysis module 210 and designs a filter as output for the 3D printer. The design of the filter is customized to allow only the specific type of scrap material for which it is designed to pass through for reuse in the 3D printing process. Each 3D printer is configured for a particular type of scrap material, and each customer filter is associated with a particular type of scrap material.

The material filtering and classification module 240 and the quality assurance and tracking module 250 cooperate as submodules of the material filtering and quality assurance module 230. The material filtering and classification module 240 takes as input the custom 3D printed filter from the filter design and 3D printing module 220. The filter can be one of any type of filter, such as a screen, visual, or magnetic, and is used for sifting through the scrap material, separating them based on their properties. The sifting process can be assisted using robotically controlled devices, including robots, drones, and similar UAVs. The sifting process selects suitable scrap materials for reuse while discarding or storing those that are not immediately useful. Overtime, a knowledge base of 3D filters is developed. The material filtering and classification module 240 can filter the scrap material using one filter, then a next filter, and so on, until the scrap material is sorted. This module can incorporate robotics and automation technology for efficient and precise filtering and classification of materials.

After the scrap materials are filtered and classified, the quality assurance and tracking module 250 ensures that the selected materials meet the necessary quality standards for reuse in 3D printing. The standards to be applied are well-know, such as the various ASTM Standards The module tracks the usage of the filtered materials, ensuring their safe and effective deployment in subsequent printing jobs. The module utilizes real-time monitoring systems and machine learning algorithms to monitor the quality of the scrap material and feedback the data to the material filtering and classification module 240 to increase the accuracy of the CNN and the resulting 3D filter.

Each of the components interacts seamlessly with the others to create a comprehensive system. The scrap material analysis module 210 feeds data to the filter design and 3D printing module 220, which then creates the appropriate filter for use by the material filtering and classification module 240. The quality assurance and tracking module 250 oversees the entire process, ensuring that the scrap materials selected for reuse meet the defined quality standards and can be used effectively. This integrated system approach enables the efficient reuse of scrap material in 3D printing, thereby reducing waste and promoting sustainability.

Figure 3:
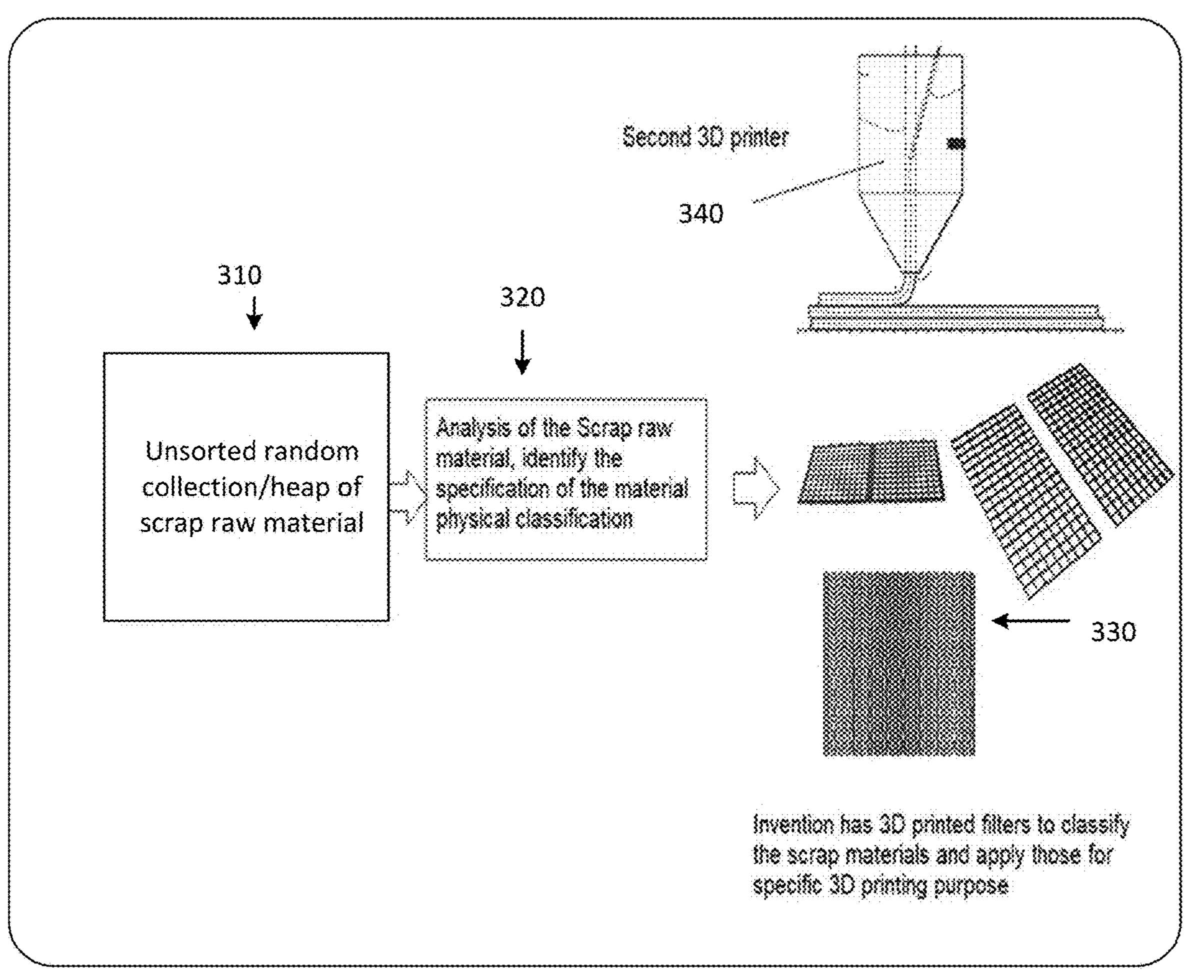
FIG. 3 is a diagram showing the overall context where embodiments of the present invention can be practiced.

FIG. 3 is a diagram 300 showing the overall context where embodiments of the present invention can be practiced.

Element 310 represents a random unsorted collection/heap of scrap material that was generated as a result of various 3D printing operations. The scrap material was generated by several 3D printers performing different 3D printing operations and using a variety of dissimilar materials. The beginning of the sorting process is illustrated by 320, where the scrap material is identified, using a variety of robotically controlled sensing devices (sensors), based on their physical properties, such as type, shape, and dimension. The physical properties of the scrap material are used to design, and 3D print a filter. Another 3D printer 340, that is, a 3D printer other than a production 3D printer that generated the scrap material, is used to 3D print the filter, 330. The filter is based on the physical properties that were identified about the scrap materials.

Figure 4:
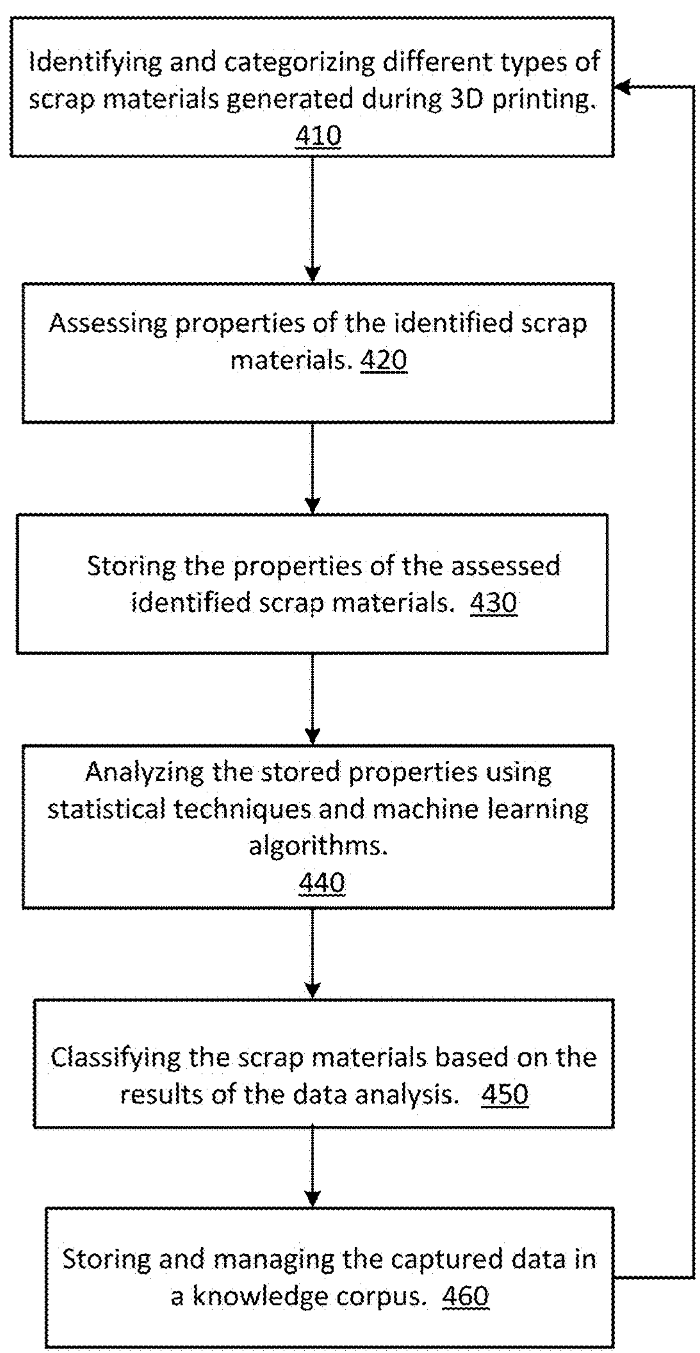
FIG. 4 is a flow chart block diagram of a scrap material identification and filtration system in accordance with the present disclosure.

FIG. 4 illustrates a flow chart of a scrap material identification and filtration system (system) 200 in accordance with the present disclosure.

The system 200 takes as input an unsorted collection/heap of scrap material that was generated during 3D printing. This can be any type of material used in 3D printing processes, including metals, carbon fiber, resins, graphite/graphene, and paper.

Because the system 200 is trained to analyze and characterize scrap material at a higher rate of speed and accuracy compared to that which a human can produce, the combination of a CNN and computer vision trained on identifying and characterizing scrap material improves sustainability in manufacturing by increasing materials reuse, thereby reducing waste.

The scrap material analysis module 210 identifies the properties of the scrap material. The analysis includes using robotically controlled sensing devices (sensors), for example, scanners, cameras, and imaging systems to scan the surface of the scrap material and distinguish the various types such as metals, plastics, ceramics, or other specific materials used in a 3D printing process. The scrap material is further categorized by shape and dimension using machine learning and computer vision. After identification, the properties of the scrap material are assessed using, for example, high-resolution imaging systems to determine their size and shape. X-ray fluorescence (XRF) or similar spectroscopic methods are used to assess the composition and purity of the scrap material. This is particularly appropriate for scrap material (410, 420).

The system 200 stores the characterized data as output in one or more formats that can be used by other modules in the system 200 or by other applications. This output data can include the classifications of the scrap material, the relationships between different material properties identified during data analysis. For example, the output can be stored in a database or in any dataset format, and provided in JSON, XML, or CSV, depending on the requirements of other modules or applications. The modules of the system 200 are integrated as a comprehensive system. However, the system 200 exposes various application programming interfaces (API), including RESTful APIs that can be used to interact with the various sensors, and with applications that are external to the system 200 (430).

At 440, the system 200 analyzes the stored properties of the scrap material using the modeling and computer vision techniques described above. The analysis includes normalizing the data, identifying patterns or clusters, and determining the relationships between different properties of the scrap materials. For example, for a visual filter, multiple metals may appear to have similar properties, such as appearance and shape. Based on the cluster of properties, a filter can be created to identify the metals, and a next filter can further identify the metals as being magnetic, etc. Machine learning libraries like TensorFlow or Scikit-learn can be used for this purpose.

The data that the scrap material analysis module 210 generates is input to the filter design and 3D printing module 220 to print a filter that is customized to allow only the scrap material of the selected type to be 3D printed to pass through. For example, scrap material of a certain type, size, and shape could be categorized together. Unsupervised learning techniques, such as K-means clustering, can perform the analysis and categorization to automatically group similar materials together (450).

At 460, the captured data that was analyzed and stored in the one or more datasets and/or databases, becomes the knowledge corpus and feedback to the CNN to improve the accuracy of the model. Through the APIs, the captured and stored data may be accessed by any of the modules in the system 200.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for scrap material identification and reuse, comprising:

identifying and categorizing, using a 3D printed filter, unsorted scrap materials into separate sorted types of scrap material according to distinct types, wherein the unsorted scrap materials comprise waste products generated during one or more 3D printing processes;

scanning a surface of each of the unsorted scrap materials to assess and sort the unsorted scrap materials according to scrap material properties;

performing quality assurance on each of the sorted scrap materials, wherein sorted scrap materials meeting quality standards is reused in a future 3D printing;

capturing and storing the assessed properties of the sorted scrap materials, wherein the captured and stored assessed properties are input to a knowledge corpus by distinct types; and training and updating a model used to 3D print by inputting the knowledge corpus and outputting a 3D printed filter corresponding to a type of scrap material being 3D printed.

2. The method of claim 1, wherein the unsorted scrap materials comprise one or more distinct types of waste product.

3. The method of claim 1, wherein robotically controlled sensing devices perform the scanning and the identifying.

4. The method of claim 1, wherein properties of the unsorted scrap materials include assessing purity and composition of metal scraps includes inspection using spectroscopy.

5. The method of claim 1, wherein each of the 3D printed filters is designed to sift a specific type of scrap material from the unsorted scrap materials.

6. The method of claim 1, wherein the quality assurance further comprises monitoring and collecting the generated waste products, using real-time systems and machine learning algorithms, wherein the generated waste products are automatically classified.

7. The method of claim 1, wherein the identifying and classifying is based on analyzing using unsupervised learning and K-means clustering.

8. A computer program product comprising:

one or more computer readable storage media; and program instructions stored on the one or more computer readable storage media to perform operations comprising:

identifying and categorizing, using a 3D printed filter, unsorted scrap materials into separate sorted types of scrap material according to distinct types, wherein the unsorted scrap materials comprise waste products generated during one or more 3D printing processes;

scanning a surface of each of the unsorted scrap materials to assess and sort the unsorted scrap materials according to scrap material properties;

performing quality assurance on each of the sorted scrap materials, wherein sorted scrap materials meeting quality standards is reused in a future 3D printing;

capturing and storing the assessed properties of the sorted scrap materials, wherein the captured and stored assessed properties are input to a knowledge corpus by distinct types; and training and updating a model used to 3D print by inputting the knowledge corpus and outputting a 3D printed filter corresponding to a type of scrap material being 3D printed.

9. The computer program product of claim 8, wherein the scrap materials comprises one or more distinct types of waste product.

10. The computer program product of claim 8, wherein robotically controlled sensing devices perform the scanning and the identifying.

11. The computer program product of claim 8, wherein the properties of the scrap material includes assessing purity and composition of metal scraps includes inspection using spectroscopy.

12. The computer program product of claim 8, wherein each 3D printed filter is designed to sift a specific type of scrap material from the unsorted scrap materials.

13. The computer program product of claim 8, wherein the quality assurance further comprises monitoring and collecting the generated waste products, using real-time systems and machine learning algorithms, wherein the generated waste products are automatically classified.

14. The computer program product of claim 8, wherein the identifying and classifying is based on analyzing using unsupervised learning and K-means clustering.

15. A computer system comprising:

a processor set;

one or more computer readable storage media; and program instructions stored on the one or more computer readable storage media to cause the processor set to perform operations comprising:

identifying and categorizing, using a 3D printed filter, unsorted scrap materials into separate sorted types of scrap material according to distinct types, wherein the unsorted scrap materials comprise waste products generated during one or more 3D printing processes;

scanning a surface of each of the unsorted scrap materials to assess and sort the unsorted scrap materials according to scrap material properties;

performing quality assurance on each of the sorted scrap materials, wherein sorted scrap materials meeting quality standards is reused in a future 3D printing;

capturing and storing the assessed properties of the sorted scrap materials, wherein the captured and stored assessed properties are input to a knowledge corpus by distinct types; and training and updating a model used to 3D print by inputting the knowledge corpus and outputting a 3D printed filter corresponding to a type of scrap material being 3D printed.

16. The computer system of claim 15, wherein the scrap materials comprise one or more distinct types of waste product.

17. The computer system of claim 15, wherein robotically controlled sensing devices perform the scanning and the identifying.

18. The computer system of claim 15, wherein the properties of the scrap material includes assessing purity and composition of metal scraps includes inspection using spectroscopy.

19. The computer system of claim 15, wherein each of the 3D printed filters is designed to sift a specific type of scrap material from the unsorted scrap materials.

20. The computer system of 15, wherein the quality assurance further comprises monitoring and collecting the generated waste products, using real-time systems and machine learning algorithms, wherein the generated waste products are automatically classified.

* * * * *